US007779298B2

(12) United States Patent
Challenger et al.

(10) Patent No.: US 7,779,298 B2
(45) Date of Patent: Aug. 17, 2010

(54) DISTRIBUTED JOB MANAGER RECOVERY

(75) Inventors: James R. Challenger, Garrison, NY (US); Louis R. Degenaro, White Plains, NY (US); James R. Giles, Yorktown Heights, NY (US); Gabriela Jacques Da Silva, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 11/761,152

(22) Filed: Jun. 11, 2007

(65) Prior Publication Data

US 2008/0307258 A1  Dec. 11, 2008

(51) Int. Cl.
*G06F 11/00* (2006.01)
(52) U.S. Cl. .......................... 714/15; 714/13; 718/100; 718/101
(58) Field of Classification Search ........................ None
See application file for complete search history.

(56) References Cited

U.S. PATENT DOCUMENTS

| 7,536,591 | B2 * | 5/2009 | Varadarajan et al. | 714/15 |
|---|---|---|---|---|
| 2004/0044642 | A1 * | 3/2004 | Fujii et al. | 707/1 |
| 2005/0081097 | A1 * | 4/2005 | Bacher et al. | 714/13 |
| 2007/0174695 | A1 * | 7/2007 | Varadarajan et al. | 714/15 |
| 2008/0209421 | A1 * | 8/2008 | Scholtz | 718/101 |
| 2008/0294937 | A1 * | 11/2008 | Ueda | 714/15 |

OTHER PUBLICATIONS

Abadi, Daniel J. et al.,The Design of the Borealis Stream Processing Engine,CIDR 2005-Second Biennial Conference on Innovative Data Systems Research (2005).

Chandrasekaran, Sirish et al.,Continuous Dataflow Processing for an Uncertain World, Conference on Innovative Data Systems Research (2003).

The Stream Group, Stream: The Stanford Stream Data Manager, IEEE Data Engineering Bulletin, 26 (1), (2003).

Michael Stonebraker, Ugur Cetintemel,Stanley B. Zdonik, The 8 Requirements of Real-Time Stream Processing, SIGMOD Record, 34(4):42-47, (2005).

(Continued)

*Primary Examiner*—Christopher S McCarthy
(74) *Attorney, Agent, or Firm*—August Law, LLC; George Willinghan (57) ABSTRACT

A method is provided for the recovery of an instance of a job manager running on one of a plurality of nodes used to execute the processing elements associated with jobs that are executed within a cooperative data stream processing system. The states of the processing elements are checkpointed to a persistence mechanism in communication with the job manager. From the checkpointed processing element states, the state of each distributed job is determined and checkpointed. Processing element states are also checkpointed locally to the nodes one which the processing elements are running. Following a failure of the job manager, the job manager is reinstantiated on one of the nodes. The recovery instance of the job manger obtains state data for processing elements and jobs from the persistence mechanism and constructs an initial state for jobs and processing elements. These initial states are reconciled against the current states of the processing elements and adjustments are made accordingly. Once the job and processing element states are reconciled, the system is returned to normal operation.

20 Claims, 6 Drawing Sheets

Recovery Reconciliation Process

OTHER PUBLICATIONS

Y. Etsion, D. Tsafrir, A Short Survey on Commercial Cluster Batch Schedulers, Technical Report 2005-13, Hebrew University, May 2005.

M.J. Litzkow, M. Livny, M. W. Mutka, Condor—a Hunter of Idle Workstations, Proc. of 8th International Conference on Distributed Computing Systems, pp. 104-111, 1988.

J.O. Kephart, D.M. Chess, The Vision of Autonomic Computing, IEEE Computer, 36 (1): 41-50, Jan. 2003.

J.G. Hansen, E. Christiansen, E. Jul, The Laundromat Model for Autonomic Cluster Computing, Proc. of International Conference on Autonomic Computing 2006, pp. 114-123, Jun. 2006.

B.F. Cooper, K. Schwan, Distributed Stream Management using Utility-driven Self-adaptive Middleware, Proceedings of the SEcond International Conference on Autonomic Computing, pp. 3-14, 2005.

M. Balazinska, H. Balakrishnan, S. Maddem, M. Stonebraker, Fault-Tolerance in the Borealis Distributed Stream Processing System, Proceedings of the 2005 ACM SIGMOD International Conference on Management of Data, pp. 13-24, New York, NY, 2005.

A. Bohra, I. Neamtiu, F. Sultan, Remote Repair of Operating System State Using Backdoors, Proceedings of the First International Conference on Autonomic Computing, pp. 256-263, 2004.

H.S. Lee, G. Gu, T. N. Mudge, An Intrusion-Tolerant and Self-Recoverable Network Service System Using a Security Enhanced Chip Multiprocessor, Proceedings of the Second International Conference on Autonomic Computing, pp. 263-273, 2005.

C. Bauer and G. King, Hibernate in Action, Manning Publications, New York, NY, 2005.

L. Amini, N. Jain, A. Sehgal, J. Silber, O. Verscheure, Adaptive Control of Extreme-Scale Stream Processing Systems, In ICDCS'06:Proceedings of the 26th IEEE International Conference on Distributed Computing Systems, p. 71, Washington, DC, USA, 2006, IEEE Computer Society.

R. Chandra, R. M. Lefever, K. R. Joshi, M. Cukier, W.H. Sanders, A global state triggered fault injector for distributed system evaluation, IEEE Transaction on Parallel and Distributed Systems, 15(7):593-605, Jul. 2004.

S. Dawson, F. Jahanian, T. Mitton, Orchestera:A Probing and fault injection environment for testing protocol implementations, Proceedings of IPDS'96, Urbana Champaign, IL, 1996.

G. Jacques-Silva, R. J. Drebes, J. Gerchman, J. M. F. Trindale, T. S. Weber, I. Jansch-Porto, A network level distributed fault injector forb experimental validation of dependable distributed systems, COMPSAC '06: Proceedings of the 30th Annual Int. Computer Software and Application Conference, pp. 421-428, Chicago, IL, USA, 2006.

D. T.L Scott, B. Floering, D. Burke, Z. Kalbarczyk, R. K. Iyer, NFTAPE: A framework for assessing dependability in distributed systems with lightweight fault injectors, Proceedings of the IEEE IPDS 2000, pp. 91-100, Chicago, USA, Mar. 2000.

N. Jain, L. Amini, H. Andrade. R. King, Y. Park, P. Selo, C. Venkatramani, Design Implementation and evaluation of the linear road benchmark on the stream processing core, SIGMOD '06: Proceedings of the 2006 ACM SIGMOD international conference on the management of data, pp. 431-442, NY,NY, USA, 2006, ACM Press.

* cited by examiner

Automatic Fault Injection Test Generation

Fig. 5

FSM Description Modified for a Fault Injection Experiment

Fig. 6

DISTRIBUTED JOB MANAGER RECOVERY

STATEMENT REGARDING FEDERALLY SPONSORED RESEARCH

The invention disclosed herein was made with U.S. Government support under Contract No. H98230-05-3-0001 awarded by the U.S. Department of Defense. The Government has certain rights in this invention.

FIELD OF THE INVENTION

The present invention relates to high availability and fault tolerance in stream processing systems over continuous data streams.

BACKGROUND OF THE INVENTION

Stream processing refers to systems and methods that analyze continuous streams of data, i.e., streaming data, including audio streams, video streams, instant messaging or chat data streams, voice over internet protocol streams and E-mail. The analysis is used for a variety of functions from monitoring customer satisfaction to detecting fraud in the financial services industry. Being able to analyze data as it streams rather than storing and using data mining techniques offers the promise of more timely analysis as well as allowing more data to be processed with fewer resources.

Systems for processing streams of data utilize the continuous streams of data as inputs, process these data in accordance with prescribed processes and produce ongoing results. Commonly used data processing stream structures perform traditional database operations on the input streams. Examples of these commonly used applications are described in Daniel J. Abadi et al., *The Design of the Borealis Stream Processing Engine*, CIDR 2005—Second Biennial Conference on Innovative Data Systems Research (2005), Sirish Chandrasekaran et al., *Continuous Dataflow Processing for an Uncertain World*, Conference on Innovative Data Systems Research (2003) and The STREAM Group, *STREAM: The Stanford Stream Data Manager*, IEEE Data Engineering Bulletin, 26(1), (2003). In general, systems utilize traditional database structures and operations, because structures and operations for customized applications are substantially more complicated than the database paradigm. The reasons for this comparison are illustrated, for example, in Michael Stonebraker, Ugur Çetintemel, and Stanley B. Zdonik, *The 8 Requirements of Real-Time Stream Processing*, SIGMOD Record, 34(4): 42-47, (2005).

In distributed systems where job schedulers are the central point of control, self-healing characteristics are typically mandatory. Jobs schedulers control distributed lifecycle operations including job submission, scheduling, dispatching, re-dispatching, suspension, resumption, canceling and completion. Failure of a job scheduler can result in the crash of the distributed system as whole, compromising processing that is occurring on hundreds or even thousands of nodes.

One type of job schedulers are batch schedulers, examples of which are descried in Y. Etsion, D. Tsafrir, *A Short Survey on Commercial Cluster Batch Schedulers*, Technical Report 2005-13, Hebrew University. May 2005. These existing batch schedulers include Moab/Maui, LoadLeveler whose ancestor is Condor, M. J. Litzkow, M. Livny, M. W. Mutka, *Condor—a Hunter of Idle Workstations*, Proc. of 8$^{th}$ International Conference on Distributed Computing Systems, pp. 104-111, 1988, Load Sharing Facility, Portable Batch System, Sun Grid Engine and OSCAR. The high-level goal of these systems is to efficiently distribute and manage work across resources. While some of these systems are able to scale to large number of nodes, such schedulers do not consider interconnected tasks. In addition, it is not feasible to apply their recovery techniques directly.

Because systems currently in use are expected to scale to thousands of nodes and because of the possible interconnected nature of its jobs, these systems need to embody autonomic capabilities, J. O. Kephart, D. M. Chess, *The Vision of Autonomic Computing*, IEEE Computer, 36(1): 41-50. January 2003, to make management of the system feasible. For example, hardware failures are inevitable and the system must be able to adapt by reconstructing applications on other nodes to keep the analysis running. A related "Laundromat Model", J. G. Hansen, E. Christiansen, E. Jul, *The Laundromat Model for Autonomic Cluster Computing*, Proc. of International Conference on Autonomic Computing 2006, pp. 114-123. June 2006, scheme for automatic management and process migration works by making the unit of control a virtual machine. This technique allows for migration of processes, but does not consider the relationships between them.

Another related management infrastructure for stream processing, which is described in B. F. Cooper, K. Schwan, *Distributed Stream Management using Utility-driven Self-adaptive Middleware*, Proceedings of the Second International Conference on Autonomic Computing. pp 3-14, 2005, uses resource constraints and utility functions of business value to optimize application resource utilization. The Borealis system, M. Balazinska, H. Balakrishnan, S. Madden, M. Stonebraker, *Fault-Tolerance in the Borealis Distributed Stream Processing System*, Proceedings of the 2005 ACM SIGMOD International Conference on Management of Data, pp. 13-24, New York, N.Y. 2005, lets users trade off between availability and consistency in a stream processing system by setting a simple threshold. Investigation of software failure and recovery in an autonomically managed environment has also been undertaken in the context of operating systems, A. Bohra, I. Neamtiu, F. Sultan, *Remote Repair of Operating System State Using Backdoors*, Proceedings of the First International Conference on Autonomic Computing, pp. 256-263, 2004, and intrusion detection and recovery H.-H. S. Lee, G. Gu, T. N. Mudge, *An Intrusion-Tolerant and Self-Recoverable Network Service System Using a Security Enhanced Chip Multiprocessor*, Proceedings of the Second International Conference on Autonomic Computing, pp. 263-273, 2005.

SUMMARY OF THE INVENTION

Systems and methods in accordance with the present invention provide for recovery of a distributed job manager in a cooperative data processing system containing a plurality of distributed sites. Each site contains a plurality of nodes and the components, either within a single node or location or distributed across the site, capable of independently processing continuous dynamic streams of data. Therefore, each site can process data independent of other sites with the system. A site is usually geographically separated from other sites, but dividing one physical location into multiple sites may be desirable in certain circumstances. The system can optionally contain sites that are of more limited processing capacity. The sites can be heterogeneous, homogeneous or some combination of heterogeneous and homogeneous sites. As used herein, heterogeneity or homogeneity among sites is based upon whether there are differences in execution environments of the sites, including but not limited to aspects such as available applications, data type systems and security and privacy policies.

Data, from primal and derived data sources including continuous dynamic data streams, resource, including processing resources, and combinations thereof are shared across the sites. Suitable shared processing resources include, but are not limited to, central processing unit resources, memory resource, storage resources, software resources, hardware resources, network bandwidth resources, execution resources and combinations thereof. The sharing of data and resources includes negotiating peering relationships among the sites. Each peering relationship contains a description of the data and the processing resources shared by one or more sites and a level of autonomy maintained by these sites. Suitable peering relationships include cooperative peering relationships and federated peering relationships. In one embodiment, facilitating the sharing among sites includes using common interest polices to define relationships between sites. Each common interest policy identifies data and resources to be shared between the sites and processing that each site is willing to perform on the data, for example on behalf of the other sites.

User-defined inquiries over continuous dynamic streams of data are processed using the plurality of sites within the cooperative data stream processing system. When a user defined inquiry is received, for example at one of the sites within the system, a distributed plan is identified for the processing of that inquiry over continuous streams of a data using the system. This distributed plan is translated into a job that utilizes data and processing resources from one or more of the sites. A given job is associated with a plurality of interconnected processing elements. These processing elements are executed on the nodes of various sites of the system, for example by arranging the processing elements into subjobs, each of which contains one or more processing elements of a given job that are deployed to the appropriate sites within the system. The cooperative data stream processing system manages the execution of the processing elements on the distributed sites using components including a job manager.

In general, each site within the cooperative data stream processing system contains an independent instance of the data stream processing environment including a stream processing core to manage the distributed execution of applications on the site, a scheduler to control the flow of data and resources within and between sites, a storage management system to control data to be persisted and a planner to assemble the applications to be executed on the site based on user-defined inquiries. In one embodiment, each independent instance of the data stream processing environment contains a complete instance of a system architecture that facilitates receipt of user-defined inquiries, processing these user-defined inquiries on continuous data streams using the sites and communicating results of the processing. Suitable system architectures include a user experience layer to interface with users to accept the user-defined job inquiries and to deliver the processing results, an inquiry services layer in communication with the user experience layer to facilitate descriptions of the user-defined inquiries, a job planner disposed within the inquiry services layer, the job planner being capable of producing one or more jobs associated with each inquiry and capable of fulfilling the job, a job management component in communication with the job planner capable of executing the jobs using the sites and a stream processing core to manage the execution of the jobs on the sites and to deliver the processing results to the user experience layer. In one embodiment, the architecture also includes a data source management component in communication with the job planner. The data source management component is capable of matching data streams to jobs.

The Job Manager (JMN) within the system is the central point of control, and a single point of failure, for distributed job lifecycle operations, including job submission, scheduling, dispatching, re-dispatching, suspension, resumption, canceling and completion. The JMN includes a recovery mechanism in the event of a crash of either the JMN or the node on which the JMN resides or in the event of the JMN going down for maintenance. In addition, if any of the nodes located in the sites to which the subjobs have been deployed go down or reboot, the JMN needs to take proper recovery actions. When the JMN is launched without recovery mode, all jobs dispatched during the previous lifetime are orphaned. In addition, the job manager and resource manager, graph manager, and scheduler become un-synchronized. The JMN, when booting in recovery mode, attempts to reconstruct a correct view of the presently running environment. Initial information is obtained from a checkpoint database, which contains the most recent information the JMN had before it last shutdown or crashed. The JMN then retrieves up-to-date information from each of the dispatched-to nodes and performs reconciliation. When an execution node (or worker node) reboots, the JMN is informed and re-dispatches processing elements that are scheduled to be running on that execution node. The failures handled include JMN node crash, JMN process crash or controlled shutdown, worker node crash, worker process crash or controlled shutdown.

The job manager itself containing a collection of plug-ins, is stateless. Therefore, no internal state needs to be recovered in the event of crash or reboot. While the JMN is running, the state of each job and each of the distributed program elements associated with each job is recorded by the JMN in a database. The database, however, may not be precise for reasons including that not all states may be recorded for performance reasons and that state changes operations are not atomic and therefore the current state may not be properly reflected in the database at the time of failure/shutdown. While the JMN is down, the state of each job is likely changing. Processing elements may complete or fail and nodes may fail. In addition, other components upon which the JMN relies, for example the Node Controller (NC) or Master Node Controller (MNC), may have failed.

The action that the JMN takes during recovery processing depends upon last known job state, either undo/redo or move forward. The present invention provides for a recovery plug-in that allows the JMN to resume at the point where the JMN was after a shutdown or a crash. The recovery plug-in handles each distributed job independently, and each distributed job is handled according to its last known state. In one embodiment, states in which the recovery process treats jobs as recoverable include start, parsing, template map, resource-match, optimizing, instantiate, dispatching, running, condemning and clean-up. Performance of the recovery plug-in is affected by the amount of recording to the database and the performance of running system. Therefore, a desired balance is maintained between these two factors. In general, having a larger amount of recording and a slower runtime yields a faster recovery. Conversely, a lesser amount of recording and a faster runtime yields a slower recovery.

In one embodiment, recovery processing using the plug-in includes querying the database for an identification of any uncompleted jobs. In addition, the dataflow graph manager (DGM) is checked for valid jobs. The job object is restored, and the current states of the distributed components, i.e., the individual processing element states, are checked. In one embodiment, checking the current state of each processing element includes keeping an in-memory table of last processing element status sent to the JMN at the MNC. Job state is reconciled, and a thread is scheduled for each job to finalize the recovery processes. If the job recovery does not complete in reasonable amount of time, a time-out occurs, and the job is marked as not recovered.

During recovery, the JMN constructs a list of all MNCs, suspends the processing element update status listener, requests that each MNC suspend sending new updates and send the table of processing element statuses stored on that MNC, processes and reconciles all MNC responses, resumes processing element update status listener and requests that each MNC resumes sending new updates. The reconciliation of each job state for each job involves making decisions considering the last known state of the job being recovered, the current status of each of the processing elements associated with that job according to corresponding MNC and the current status of each processing element (PE) according to DGM.

Finalization of the recovery includes requesting the MNC to start or to stop processing elements according to reconciliation and waiting for confirmation that the starting and stopping of processing elements has occurred. Once all processing elements for a given node have been reconciled, normal MNC processing on that mode is started. Once all nodes have been reconciled, or time-out, a recovery report is issued and recovery is terminated. The resource manager (RMN) notifies the JMN of various failures and reboots. When notified of a node failure, the JMN attempts to restart processing elements scheduled for that node. When the MNC fails, since the MNC has no persistence mechanism, the JMN sends start requests for each processing element that should be running on that node. The MNC reconciles with the NC. The JMN marks all the processing elements on nodes as NotStarted, then waits for updated status which should be either Accepted, Started or just Started (of already running). When the NC fails, the MNC fetches from its in-memory cache the processing elements that need to be started and requests to the NC that these should be started.

In one embodiment, the present invention is directed to a method for failure recovery of a job manager within a data processing system, including distributed processing systems and data stream processing systems. A job manager is instantiated on one of a plurality of nodes to manage distributed execution of jobs on the plurality of nodes. The management of job execution for each job includes managing the deployment and execution of a plurality of processing elements associated with each job on the plurality of nodes in accordance with instructions from a job scheduler. The current state associated with each one of the plurality of processing elements associated with the jobs managed by the job manager is checkpointed. The job manager subsequent to a failure of the job manager is recovered using the checkpointed processing element states.

In one embodiment, the current state of each processing element is checkpointed in response to a state change. In one embodiment, the current state of each one of the plurality of processing elements is saved to a persistence mechanism in communication with the job manager. Suitable persistence mechanisms include at least one database in communication with the job manager. In order to recover the job manager instance following a failure, a replacement job manager is instantiated and the checkpointed processing element states are retrieved using the replacement job manager. An initial recovered state is constructed for each job and its constituent processing elements using the retrieved checkpointed processing element states. In one embodiment, the initial recovered states for the plurality of processing elements are reconciled with actual current states for the plurality of processing elements.

In one embodiment, checkpointing of the current state is suspended for each one of the plurality of processing elements in response to the failure of the job manager and is resumed for each one of the plurality of processing elements following recovery of the job manager. Suspending checkpointing includes maintaining a chronological log of checkpointed states at each one of the plurality of processing elements, and resuming checkpointing includes delivering the chronological log of checkpointed states from each one of the plurality of processing elements to the recovered job manager.

In addition to checkpointing PE states to a central persistence mechanism, each one of the plurality of processing elements can be checkpointed locally at each node on which the plurality of processing elements are being executed. In addition to checkpointing processing element states, job states can also be checkpointed. In one embodiment, a current job state for each job managed by the job manager is determined using the checkpoint processing element states, and the current job states are saved in a persistence mechanism in communication with the job manager. Each saved current job state can be updated in response to changes in the checkpointed processing element states. Having checkpointed job states, these checkpointed job states can be used to recover the job manager. In one embodiment, using the saved current job states includes identifying uncompleted jobs based on the saved current job states.

The current job states include submitted, mapping, dispatching, canceling and running. In one embodiment, failures are accounted for in at least one of processing elements, execution nodes, a database management system and a dataflow graph manager that are concurrent with the job manager failure. In one embodiment, the checkpointed current states include starting a job program element, stopping a job program element, suspending a job program element, resuming a job program element, loading a job program element, unloading a job program element, node failure, node controller failure, master node controller failure, node boot, node controller boot, master node controller boot, job manager failure or job manager boot.

The present invention is also directed to a method for failure recovery of a job manager within a data processing system. A job manager is instantiated on one of a plurality of nodes to manage distributed execution of jobs on the plurality of nodes. Management of job execution for each job includes managing the deployment and execution of a plurality of processing elements associated with each job on the plurality of nodes in accordance with instructions from a job scheduler. A current state associated with each job and a current state associated with each one of the plurality of processing elements associated with each job managed by the job manager are checkpointed. A current job state for each job managed by the job manager is determined using the checkpointed job and processing element states, and the job manager is recovered subsequent to a failure of the job manager using the checkpointed processing element states, the checkpointed job states and the current state for each job.

In one embodiment, the present invention is directed to a method for failure recovery of a job manager within a distributed processing system. A job manager is instantiated on one of a plurality of nodes to manage distributed execution of jobs on the plurality of nodes. Management of job execution for each job includes managing the deployment and execution of a plurality of processing elements associated with each job on the plurality of nodes in accordance with instructions from a job scheduler. A current state associated with each job and a current state associated with each one of the plurality of processing elements associated with the jobs managed by the job manager is checkpointed. The job manager is recovered subsequent to a failure of the job manager using the checkpointed job and processing element states. In one embodiment, recovery of the job manager further includes coordinating recovery of the job manager with at least one component responsible for managing a given type of processing element. The components include a dataflow graph manager, a system service manager and a virtual world manager.

DETAILED DESCRIPTION

Systems and methods in accordance with the present invention provide for recovery of a job manager that is running on one of a plurality of nodes within a given domain or site. This domain or site can be one of a plurality of domains or sites that work together as a cooperative data stream processing system. This stream processing system enables program fragments, i.e., process elements (PEs), to be distributed across a plurality of nodes and to be connected to form complex applications. A given site containing a plurality of nodes can contain tens of thousands of interdependent and heterogeneous PEs running across thousands of nodes. Although the distributed stream processing system contains components that autonomically manage the PEs, the components of the distributed system are susceptible to failures that can jeopardize the operation of the system and the execution of applications on the system.

One of the management components that is used to autonomically mange the PEs is the job manager. An instance of the job manger runs on one of the nodes within each site within the system. Each instance of the job manager manages the deployment and execution of PEs on all of the nodes within a given site. Therefore, failure of the job manager can cause failures in the PEs. The present invention provides for the recovery of the job manager following a failure without interrupting any of the running PEs by reconciling with other autonomous system components.

Stream processing analyzes streaming data including audio data, video data, chat data, voice-over-IP data, and email data for applications ranging from monitoring customer service satisfaction to fraud detection in the financial industry. Being able to analyze streaming data as opposed to using data mining techniques on static databases facilitates more timely analysis and allows more data to be processed using fewer resources. In the cooperative data stream processing system, the streaming analysis lends itself well to componentization and distribution. In particular, large and complex streaming analysis jobs are broken into small software building blocks, i.e., the PEs. For example, a filtering PE may consume a first stream and produce a second filtered stream that is consumed by a correlation PE that correlates the filtered stream with a third stream of data. This composition of applications created by connecting PE building blocks together allows for rapid development and introduction of new types of analysis by creating new PEs that are able to produce and to consume data streams. In addition, this division of jobs into PEs connected by streams provides a natural way to distribute the computation task among a cluster of resources. Different types of PEs are placed on different nodes, and the streaming data for PEs that are related by being part of the same job or subjob communicate over a network.

Figure 1:
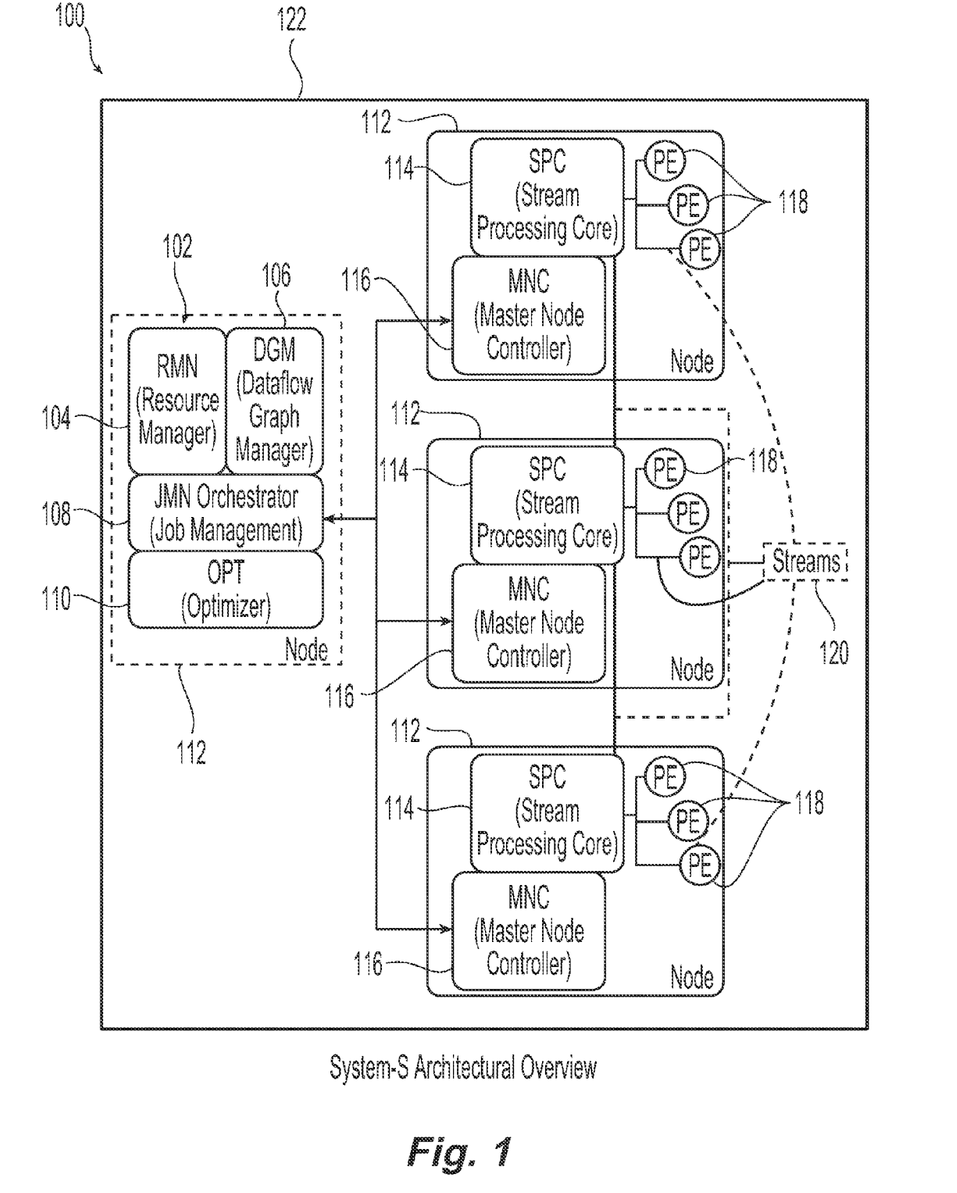
FIG. 1 is a schematic representation of an embodiment of a cooperative data stream processing system for use in accordance with the present invention.

Referring initially to FIG. 1, an exemplary embodiment of a cooperative data stream processing system architecture 100 that can be utilized in methods for recovering job managers in accordance with the present invention is illustrated. The cooperative data stream processing system is a highly-scaled distributed system that supports high volume stream processing. The system includes a plurality of cooperating sites and each site 122 includes a plurality of nodes 112. Running on the nodes of each site are instances of all the necessary components for data stream processing. These components include a number of loosely-coupled runtime components and extensive tooling including an IDE to support composition of streaming jobs, a sophisticated planner, and visualization tools.

The components include the job manager component (JMN) 102, which is instantiated on one of the nodes within the site. The JMN includes a central "orchestrator" portion 108, a resource manager (RMN) 104, a dataflow graph manager (DGM) 106 and an optimizer (OPT) 110. The DGM manages and tracks the graph of connections among the various streaming processes, and the OPT determines initial placement of processes and initial resource allocations and continually adjusts both placement and allocations throughout the life-cycle of a job. The components also include a master node controller (MNC) 116, and a stream processing core (SPC) 114, which manages the streaming communication system.

In general, the cooperative stream processing system and the components contained on the nodes of each site support the scheduling, dispatch, and management of jobs. A user-defined inquiry is submitted to the system. From this user-defined inquiry, a distributed plan for the processing of the inquiry is developed. This distributed plan is translated into a job. The job, which is also referred to as the distributed job or streaming job, contains a plurality of PEs that use a highly optimized communication layer to exchange streaming data. Each PE contains application logic and perform specialized functions including filtering, annotating, segmenting and joining of streams. The PEs are grouped into subjobs that are deployed to the appropriate nodes within a site. Individual PEs 118 are distributed, started, stopped and recovered using the system components. Because data are streamed from PE to PE, for example using tunnels, the loss or failure of a single PE can cause an entire job to fail until the PE is repaired.

The cooperative data stream processing system provides for autonomous operation and component failure recovery. For example, as data changes occur such that there is suddenly less useful data on a stream, the cooperative data stream processing system shifts resources to PEs processing other streams. In another example, if a node hosting a PE fails, the system automatically allocates a new node, moves the PE to this new node and connects the PE to all of the required producer and consumer data streams.

Exemplary methods in accordance with the present invention facilitate the self healing nature of the various components of the cooperative data stream processing system and in particular the JMN. The JMN can be abruptly terminated and recovered without interrupting any of the running PEs by reconciling with other autonomous system components. The system is able to autonomically respond to a wide variety of error conditions including the abrupt termination and recovery of key system components. In addition, JMN recovery can be performed under a variety of system workloads.

The JMN framework is built around a highly modular, "pluggable" arrangement, similar in spirit to the Eclipse architecture, which is described in A. Bolour, *Notes on the Eclipse Plug-in Architecture*, http://www.eclipse.org/articles/Article-Plug-in-architecture/plugin_architecture.html. During bootstrap, the JMN framework initializes basic logging, network and configuration services. The plug-in manager is then invoked to dynamically load the pluggable functions that allow the JMN process to do useful work. Pluggable components provide all of the key features of JMN such as the external application program interface (API), network protocols, persistence, system interfaces (e.g. to OPT, SPC, DGM, etc.), time services, security, and resource management. Different pluggable functions are loaded into the framework to provide the following JMN processes of central orchestrator, MNC and RMN.

The central orchestrator of the JMN provides traditional job management functions, fielding job submission and control, orchestration job life-cycles and persistence of job related information, i.e., PE and job states, into the JMN database. Although multiple instances of the central orchestrator can be provided, preferably there is a single instance of the central orchestrator, i.e. a single JMN, disposed on a node within each site. The MNC runs on every node on which PEs are to be started. The MNC receives, executes and manages start, stop, and various administrative orders from the JMN and provides the primary interfaces to the SPC. The RMN provides resource manager functions including resource discovery, monitoring and management. The primary control mechanism of the JMN, and in particular the orchestrator portion, is a Finite State Machine (FSM) engine. The FSM engine itself does not define any automata. Rather, the FSM engine provides a framework upon which automata may be defined and managed. Automata can be defined consistent with Moore, Mealy, and hybrid FSM models, which are known and available in the art.

In one embodiment, specific FSM implementations are defined externally via an extensible mark-up language (XML) document. The FSM engine reads the XML document and constructs a specific instance of the FSM based on that document. In one embodiment, multiple, disparate FSM instances are constructed and operated within the same process. In addition, different FSM instances can be assigned to different jobs in the system if it is determined that the life-cycles of these jobs are different. For example, the life-cycle of a streaming job may be different from the life-cycle of a non-streaming job. Implementation of states and actions, i.e., transitions, in accordance with the FSM are accomplished using the plug-in mechanism of the cooperative data stream processing system.

An FSM instance contains a collection of states. A portion of an exemplary FSM definition that specifies a single state called optimizing is illustrated as follows.

```
<state id="optimizing" number="5">
    <property name="updatedb" value="false"/>
    <transition id="optim" nextState=ndgm-inst">
        <method object="fsmimpl" name=ndgmlnst11 />
    </transition>
    <transition id="cancel" nextState="cleanup">
        <method object="fsmimpl" name="dgmUnmap" />
        <method object="fsmimpl" name="qCancel" />
    </transition>
    <transition id="error" nextState="cleanup">
        <method object="fsmimpl" name="dgmUnmap" />
        <method object="fsmimpl" name="qToCancel" />
    </transition>
    <transition id="recover" nextState="dgm-inst">
    </transition>
</state>
```

A given state includes a collection of transitions. A transition includes a number of methods. When a transition is triggered, each of the methods associated with it is executed in turn. When the last method returns, the state is advanced to the next state specified by the transition. It is possible to associate no methods with a transition, in which case state advances with no associated action. Each method specifies an object, which may be a plug-in, and a method on that object to execute. The methods must implement a specific interface that provides context for the execution of the method. Arbitrary annotations can be added to a state. These annotations may be queried by specific automata as needed. The updated property is used by the FSM to determine whether the act of transitioning to this state should be persisted in the checkpoint database, i.e., the persistence mechanism in communication with the JMN.

Because the FSM definition is externalized, the FSM behavior is easily modified without code changes. This ease of modification is used to build a state-based fault injection system to validate that the system is able to self-heal under a variety of error conditions.

The JMN, and in particular the orchestrator portion of the JMN is a central component of the cooperative data stream processing system. All job submission and management flows through the JMN. Hence, the JMN is also a single point of failure. A JMN crash makes the system unavailable for submission of PEs and management of existing PEs. However, since the system is distributed, failure of the JMN does not imply a total failure of the cooperative data stream processing system. The present invention provides for the recovery of the JMN by instantiating a new JMN on either the same node or a new node within the site and synchronizing the state of the recovery JMN with the nodes. All of the other components and nodes within the system are not disturbed, and no work is lost. In one embodiment, a recovery technique is implemented that brings the JMN to a state consistent with all the components, i.e., DGM, SPC, OPT, RMN, jobs and PEs, in the system. All state transitions of the distributed PEs and jobs that occurred during the outage, including the possible failure of those PEs and jobs, are reconciled.

The JMN can fail for a variety of causes. These causes include, but are not limited to, a physical node failure, a crash of the JMN process or link failure. In a link failure, the node on which the instance of the JMN is running loses its network connection. While the recovery techniques could also be used for planned outages or migrations of the JMN, planned outages and migrations are more efficiently handled using a controlled process.

The job management architecture is a plug-in-based architecture with all useful functions and components implemented as plug-ins. Most of the plug-ins are stateless and, therefore, do not require any recovery action. In fact, the only state that has to be maintained between executions is the state of the jobs running in the system.

When a fault or failure occurs, a given job can be in any of the states defined by the externalized FSM description. Further, events that trigger job state transitions could also occur at any time. A job state is dependent not only upon the state of the JMN itself, e.g., whether or not it us up and running and able to receive and record status updates, but also upon all the nodes that have PEs executing for that job. Therefore, the state of each PE associated with a given job is also required to determine the current overall state of a given job. The state of each job and the state of each PE are saved using persistent objects, propagating the job state and its identification to a persistence mechanism in communication with the JMN. The job and PE states are persisted using a checkpointing mechanism that communicates the states to the JMN in accordance with prescribed parameters, for example upon a change in the state of a PE or following a prescribed time interval. Suitable persistence mechanisms include one or more databases that can be located on the same node as the JMN or distributed across other nodes. In one embodiment, the state of each PE of a given job is inserted in the persistence mechanism using the Hibernate service, which is described in C. Bauer and G. King, *Hibernate in Action*, Manning Publications, New York, N.Y., 2005. In one embodiment, the state of each PE is also persisted or checkpointed and stored locally on the nodes on which the PEs are being executed.

Since the state of a given job is based, in part, on the states of the underlying PEs of that job, in one embodiment, the overall state of a given job is determined based on the current persistent states of the PEs. In addition, the state of the job is updated in accordance with changes in the states of the PEs. While job state persistence can be triggered every time there is a job state transition to maintain the most up to date state, persistence of states is preferably performed selectively, for example via an annotation mechanism. Selective updating avoids the negative performance impact of persisting the updates generated by all the jobs in the system and all their distributed PEs. In addition, individual job state is dependent on the distributed state of its individual PEs. However, state change in an individual PE may not require a job state update. Therefore, job state is persisted only when the collected state of its PEs indicates that such an update is required. Hence, the state of the database when failures occur may not reflect the actual current state of all of the PEs within the distributed system. In addition, individual PE states may change during the failure and recovery process. The inconsistencies between persisted states and actual states and post-failure state changes are reconciled with the state of the JMN during JMN recovery. Reconciliation is performed using the database state as a starting point to recover each job. Different reconciliation procedures are used for each job, for example, undo/redo or state forwarding, depending on the state of the job at the time of the failure.

In one embodiment, for some types of job FSMs, the current state of the job can be determined from just the states of the distributed processing elements alone. No collective job state needs to be persisted prior to recovery or utilized during recovery.

Figure 2:
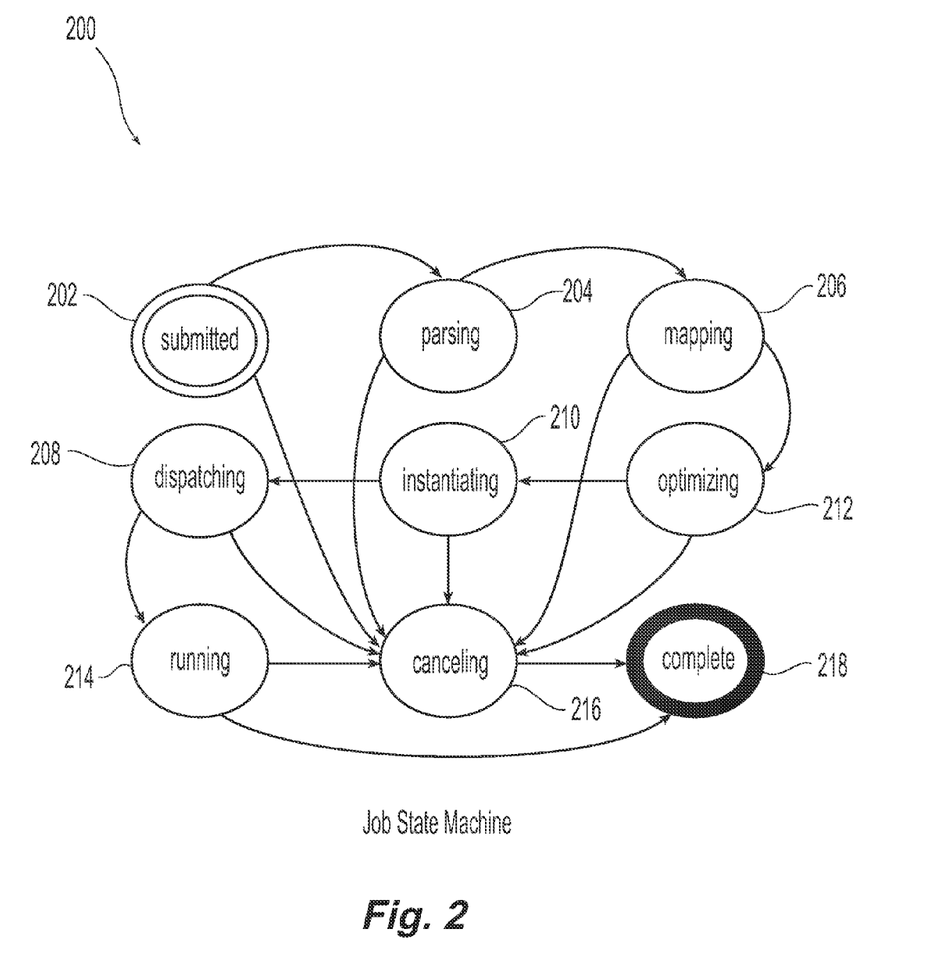
FIG. 2 is a schematic representation of an embodiment of a finite state machine for a job.

Referring to FIG. 2, an exemplary embodiment of a simplified state diagram 200 for a job is illustrated. When a job is derived from a user-defined inquiry submitted 202 to the cooperative data stream processing system, the data associated with the job, e.g., the job's description, are persisted to the database, and the job state transitions to the parsing state 204 where the job description is interpreted. Until the job state arrives at the mapping state 206, only the JMN is aware of the job relative to the other job execution components, OPT, DGM, and SPC. In the mapping state 206, the JMN requests the DGM to map the potential streaming connections among PEs. The job state then transitions to the optimizing state 212, where node placement decisions are made by the OPT. Following the optimizing state, the job state transitions to the instantiating state 210, where DGM is contacted once more to inform the DGM of the node assignments for the PEs. In the dispatching state 208, the JMN contacts agents (MNCs) at each of the nodes assigned to the job to begin execution of the PEs. From this point, the job state is dependent on the collective distributed state of the PEs. When all PEs have started, the job state transitions to the running state 214. After the PEs are finished, the job completes 218. From any given state, the job could be terminated by advancing to the canceling state 216 for example as the result of a failure or user command. In one embodiment, by analyzing the impact of a fault in each state, the states submitted 202, mapping 206, dispatching 208, canceling 216 and running 214 were determined to require checkpointing to the persistence mechanism of the JMN.

If a job misses a PE state transition, the FSM may stall. The MNCs normally communicate with the JMN through asynchronous status update reports. If the JMN fails, the MNCs detect message failure and keep these messages on a first-in first-out (FIFO) list for timed retransmission. During recovery, the communication mechanisms of the JMN are fully functional. However, the status listener of the JMN returns error status to any arriving PE state change messages, insuring that these messages remained enqueued locally in the retry lists of the MNCs. Once the JMN is able to process the PE state change messages, the block is removed from the status listener, and after at most one retry cycle all nodes will report all pending PE state change status updates in the correct chronological order.

Consistent with the JMN architecture, in one embodiment, the recovery module is implemented as a plug-in that is loaded when the recovery JMN is instantiated after a failure or shutdown. In one embodiment, the recovery process for the JMN includes querying the persistence mechanism for any uncompleted jobs, synchronizing valid job states with the DGM state if needed and performing recovery actions based on the state of each job. In addition, a thread can be scheduled, if necessary, to finalize the recovery process. The reconciliation process occurs when the JMN contacts the PEs to reach a consistent state.

The persistence mechanism is the starting point for JMN recovery. The management representation of all of the uncompleted jobs in the system in general and in particular running on the nodes within the site is restored from the checkpoint and their object instances in the JMN are recreated. The persisted states of the jobs and PEs are used to recover the JMN. The exact steps taken during JMN recovery can be based on the current job state. In one embodiment, these persisted job states include submitted, mapping, dispatching, canceling and running. Therefore, the recovery process can be described with reference to the persisted job state.

When the checkpointed job state is submitted, the job could have already advanced to the parsing state before the failure (FIG. 2), and the parsing state is not persisted. However, the canceling state and mapping state are not possible because these states would have been persisted. Since the parsing state and submitted state do not depend on the state of any distributed PE, the recovery process can safely reset the job state to submitted so that the submission can be restarted.

When the persisted state is mapping, the only possible un-persisted transitions before a failure are the optimizing and instantiating states. The canceling and dispatching states would have been persisted. Transition to the mapping state triggers an interaction with the DGM that advances the state of the DGM. Completion of that interaction with DGM triggers a transition to the optimizing state that causes and interaction with the OPT. During recovery, if a query of the DGM reveals that it does not have state for a job, then the job state can safely be returned to mapping to attempt the mapping operation with the DGM again. If instead the DGM has state for the job, then it is not possible to tell whether the mapping completed and the state was advanced to optimizing or instantiating before the failure or if the mapping did not complete. In either case, the available resources and PEs may have changed during the failure causing the map to no longer be valid. Since nothing has actually been dispatched and it is relatively cheap to start over in these cases, the state is cleared from the DGM by calling unmap and then returning the state of the job to mapping to trigger a new map with the DGM.

When the persisted state is dispatching, the JMN may or may not have made the requests to start each of the PEs on each of the nodes. The MNCs queue state transition messages while the JMN is unavailable. In one embodiment, to recover, the JMN queries the MNCs and collects all of the messages that the MNC has queued as well as the last successful MNC state updates for each PE. If any PE of a job has a non-started status, the job resumes the dispatching steps. If all PEs are started, the job may move forward to the running state. In another embodiment, the MNC messages remain queued. In this embodiment, the recovery process proceeds without this information and the MNC messages are then processed in chronological order.

When the persisted state is the running state, some or all of the PEs may have completed during the failure or recovery process. To recover, the JMN contacts the nodes to get the latest state information about the PEs. After the JMN gets all the responses, the state of the job is updated accordingly. The job is placed in the running state if there are some PEs running or in the complete state if all PEs have completed. If a PE is not known by its recorded MNC, the PE has completed or the MNC has failed during the JMN failure. In that case, the corresponding PE is marked as completed, and the job state advances depending on the state of all its PEs.

When the persisted state is canceling, some or all of the PEs may have completed during the failure as in the persisted running state. In that case, the nodes have to be queried to determine the current state of the constituent PEs so the job can be recovered as completed or held in the canceling state. As with the running state, if a PE is not known by its recorded MNC, then the PE has completed or the MNC has failed and restated. In either case, the PE is treated as complete and the job state advances accordingly.

Figure 3:
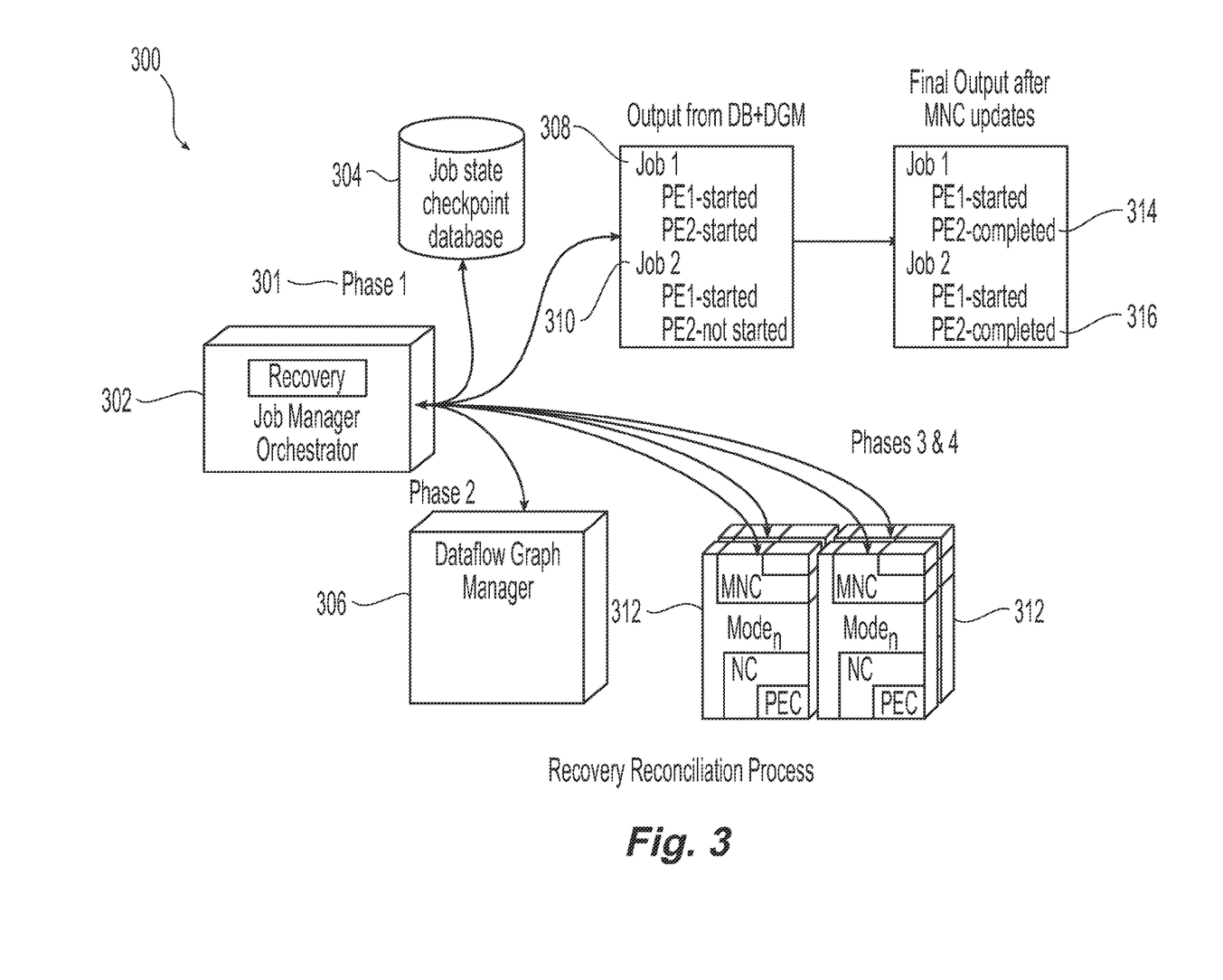
FIG. 3 is a schematic representation of an embodiment of the job manager recovery reconciliation process in accordance with the present invention.

Referring to FIG. 3, an exemplary embodiment of the overall view of the recovery reconciliation process 300 is illustrated. Following failure of the JMN, a recovery JMN 302 is instantiated, for example on the same node or a different node. During an initial phase 301, the recovery JMN 302 queries the checkpoint database 304. From the checkpoint database, the JMN obtains the checkpointed states of the PEs and jobs. After the checkpointed data are retrieved, the JMN reconciles with the DGM 306 and recovers the jobs that were in submitted and mapping state. After these two phases, the JMN has information about all jobs in the system; however, inconsistencies may exist between this data and the actual states of the jobs and PEs. For example as obtained from the checkpointed database, a first job (Job 1) 308 has two PEs started, and a second job (Job 2) 310 with one PE started and another one not started. In a third phase, the JMN then queries the master node controllers about the last state of the constituent PEs and updates the overall state of the job. The PEs states are updated accordingly. For example one PE of the first job is updated to the state completed 314, and one PE for the second job is updated to the state completed with exception 316. A fourth phase guarantees completion of the previous phase. After finishing the reconciliation phases, the JMN is consistent with all the components of the system and can start to operate normally, e.g., receiving new requests.

The JMN depends on four remote entities to recover successfully. These remote entities include PEs, MNCs, a database manager system (DBMS) and the DGM. Failure of any of these remote entities adversely effects and in some cases can completely prohibit the recovery of the JMN. Failures of these components can occur when the JMN is not running during recovery. When a PE fails, the MNC detects this failure and reports the status, i.e., state, of the PE as "exception". Reporting of the status is handled via a state transition. The JMN may take further actions, for example, moving the PE to another node, determined by system policy as applied to the job. PE failure can result from the failure of the node on which the PE is running. The node can fail in two situations of interest, before JMN failure and recovery, and during JMN recovery. If node failure occurs before the JMN begins recovery, this failure is detected when communication to the node fails. If the node fails during the recovery process, the JMN may wait indefinitely for the response to the query of the current status of the PEs. To successfully recover under this situation, the JMN schedules a thread that times out if a node is unresponsive to a PE status query. If the node is determined to have failed because of a timeout, the JMN treats this as a PE failure and applies system policy to the job to determine the recovery strategy, e.g., cancel the job, restart the PE elsewhere, etc. The JMN relies on the DBMS for checkpoint availability and integrity. If the DBMS fails, the JMN relies on the fault tolerance mechanisms of the DBMS itself. Similarly, the DGM has its own fault tolerance mechanism. However, the JMN can not operate without the DBMS or DGM, so any JMN recovery strategy may require waiting for recovery of these processes before its own recovery can begin.

Examples were run to validate the JMN recovery mechanism to obtain the high availability requirements of the JMN in the cooperative data stream processing system. The ability of the cooperative data stream processing system to survive under various abnormal behaviors of all the participating components distributed across a network of nodes is a challenge. A fault injection tool was developed to validate the JMN recovery method of the present invention. The technique can also be used to validate other recovery mechanisms within the cooperative data stream processing system, as well as any distributed system controlled by an externalized finite state machine.

The JMN performs scheduling and dispatching of jobs based on an externalized finite state machine (FSM), which can be expressed using a mark-up language, such as XML. A fault injection tool, FSM Fault Injector (FSMFI), leverages the fact that the FSM in the JMN framework is externalized by augmenting the FSM definition with the faults. This approach permits the injection of errors based on the system state and also facilitates injection of errors in other nodes of the distributed system. The advantage of this fault injection tool is that it can precisely exercise a distributed system under a variety of faulty conditions. Since each fault injection occurs explicitly in system states, testing can be more targeted with greater confidence in the test coverage.

To ensure that the operational FSM does not have errors introduced by fault injection a fault injection test (FIT) document is created that defines a fault injection campaign in a standardized format, e.g., in an XML document, and specifies the states and the transitions in which the fault injection will take place. The faulty behavior can be chosen from a fault injection library or defined through user input. After the definition of the FIT document, the FSMFI tool creates an augmented FSM description that is modified with fault injection annotations. The modified FSM is loaded and the FSM Engine calls the fault injection methods when appropriate. Using this technique a user can easily add, remove and change faulty behavior without making any changes to the original application.

Figure 4:
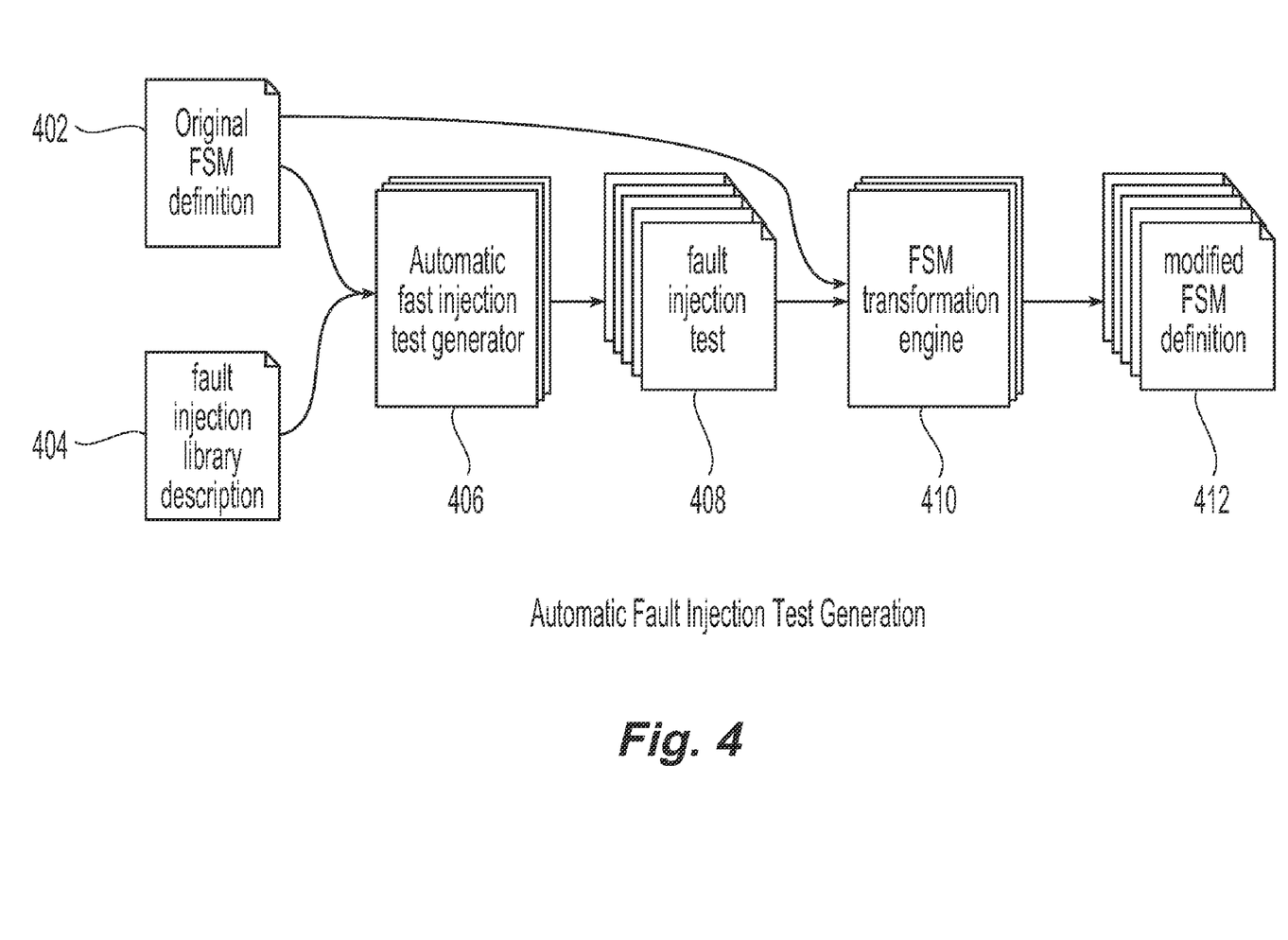
FIG. 4 is a schematic representation of an embodiment of an automatic fault injection test generation.

Referring to FIG. 4, an illustration showing how the original FSM description of the distributed application 402 and the fault injection library description 404 are used as input for an automatic fault injection test generator 406 is provided. The output is a plurality of FIT documents 408 that describe the various fault injection tests. These FIT documents are used as input, along with the FSM description 402, to a FSM transformation engine 410 that generates modified FSM definitions 412.

The FIT language for specifying the fault injection test includes a description of the faults to be injected as well as information that implies a modification directly to the FSM and information related to the configuration of the fault injection library, e.g., time trigger. It is described in a standardized format according to a fault injection schema. The implementation of fault injection methods, which emulate the faulty behavior desired by the user, may be through the use of pre-implemented methods from a fault injection library or plug-in. These fault-providing methods may accept runtime configuration options described in the fault injection test XML document. As illustrated, the library is implemented as a fault injection plug-in.

An example of a fault injection campaign description is shown below. The example shows both runtime option, used by the fault injection library, and offline options used by the FSM transformation engine. In this example, the faulty behavior is implemented by the method peCrash in the jmn.util.fi.FaultInjection class. The target of the fault injection is a subtask (FilterTask.out) executing in machine 30. The trigger is based on the state of a job and optionally also by a timer. Here the fault is triggered when the job is in the running state and it makes a peStatusUpdate transition. Since there is also a timer configuration, the fault is injected at a random time between 0 and 4000 milliseconds after the transition is taken.

```
<faultInjection>
    <target id="pe" peId="sink" executableName="FilterTask.out">
        <node>machine30</node>
        <trigger>
            <timer min="0" max="4000"/>
            <jobNumber>10</jobNumber>
            <peNumber>2</peNumber>
        </trigger>
        <state>running</state>
        <transition>peStatusUpdate</transition>
        <injectionClass>jmn.util.fi.FaultInjection</injectionClass>
        <injectionMethod>peCrash</injectionMethod>
    <target>
</faultInjection>
```

Figure 5:
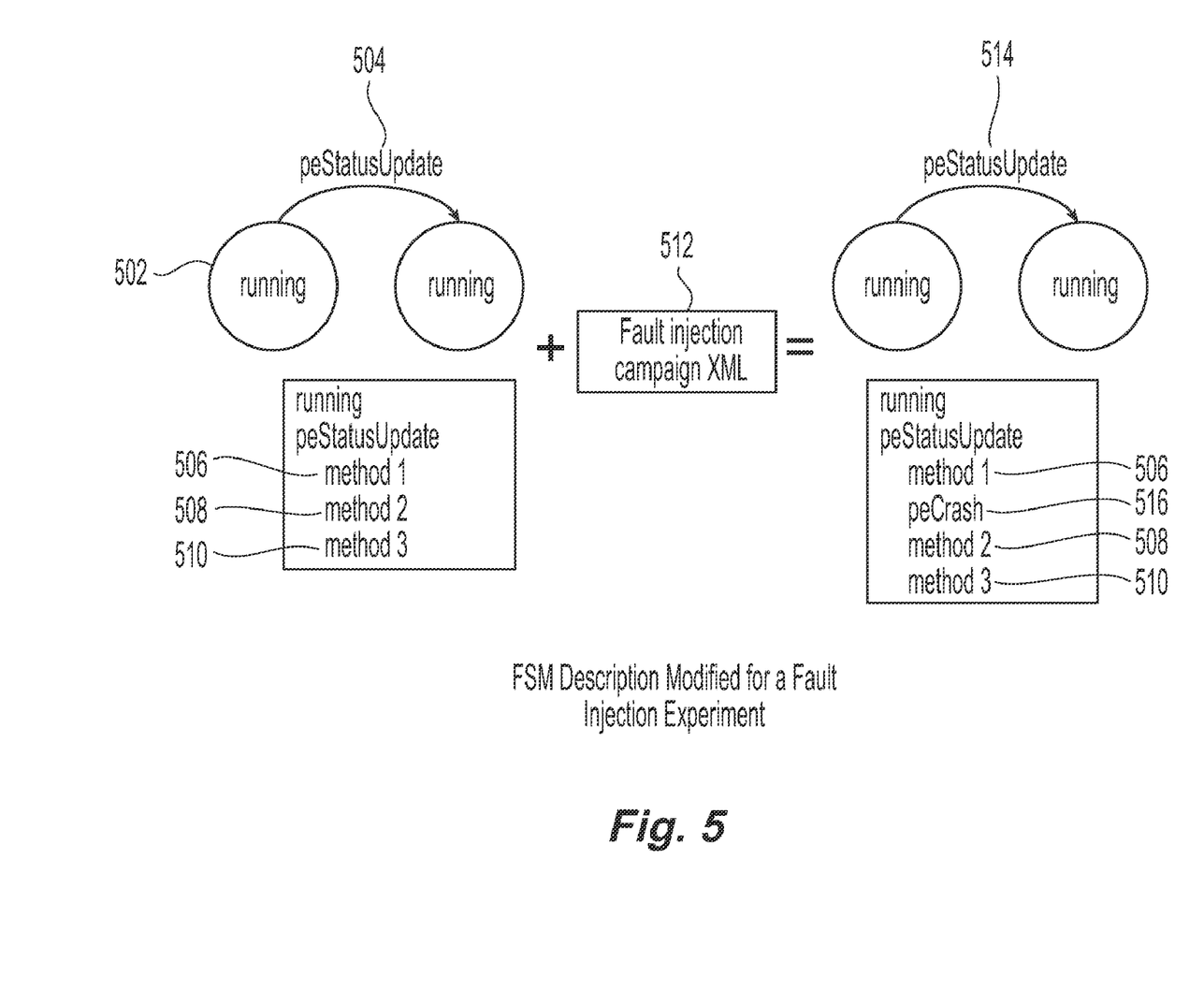
FIG. 5 is a schematic representation of an embodiment of a modified finite state machine for fault injection.

Referring to FIG. 5, an illustration of how the FSM description is modified by a configuration as shown above is given. Originally, when a job is in the running state 502 and makes a peStatusUpdate transition 504, it executes in sequence method 1 506, method 2 508 and method 3 510. After processing the original FSM with the fault injection description 512, the new FSM is generated with the fault injection method inserted in the state transition. During the scheduler execution, when such a transition 514 is taken, the fault injection method is invoked and, in this case, injects a task crash fault 516, according to the configuration passed to the fault injection plug-in. In this example, the injected fault 516 is invoked between method 1 506 and method 2 508. Using the FSMFI mechanism, tests of the JMN recovery mechanism can be automatically constructed from the original externalized FSM and the fault injection library. While the approach requires use of an externalized FSM, the benefits for validation such as granularity and repeatability are compelling.

Experiments were conducted with cooperative data stream processing system running on several Linux nodes. One node was running an instance of the JMN, and another node was dedicated to the DGM. All nodes were running MNCs and executing PEs. To reduce complexity, a random placement mechanism was used instead of the optimizer. The checkpointing database was running on the same node as the JMN, and the DBMS used was HSQLDB, http://hsqldb.org. For all experiments, the components of the cooperative data stream processing system are instantiated on the appropriate nodes. After the JMN, DGM and all MNCs are running, jobs are submitted to the system. For each of the experiments, under different conditions, a crash fault is injected into the JMN. After the JMN crashes, the JMN is re-instantiated in recovery mode on the same node. In the first experiment, the crash of the JMN occurs when the system is in steady state, and in the second experiment the crash occurs in the middle of a job dispatch.

The first experiment shows the recovery of the JMN while in a steady state. Steady state means that no jobs are being submitted to the system during the time of crash and that all the jobs already in the system are in running state, so no new transitions related to job start are being sent to the JMN. Multiple jobs, each containing 31 PEs, are submitted, out of which there was one source PE and 13 sink PEs, for purposes of tunneling. The placement of the PE's on the plurality of nodes is chosen at random by the system after job submission. Another test with a set of 104 jobs containing a total of 737 PEs was also carried out. These jobs have some PEs that are shared among multiple jobs and also have stream connections between PEs of different jobs. That test set was used to more closely represent real world systems (RWS).

The experiment begins by starting up the system and submitting a specific number of jobs. A crash is introduced into the system by causing the JMN to abruptly stop when all the jobs are running in the system. The PEs continue to run on the nodes after the JMN failure. At this point, no new jobs can enter the system, and the jobs that are running cannot be cancelled. After the JMN crashes, the JMN is re-instantiated on the same node in recovery mode. During the recovery, the JMN successfully contacts all MNCs. In addition, the JMN updated the state of all the jobs and the PEs according to the states checkpointed by the JMN and each MNC. Following complete recovery, new jobs can be submitted and further updates for existing jobs can be processed normally.

The above process of crashing and restarting the JMN is carried out multiple times. Time to recover in each case is noted. Another set of tests are carried out where the system is started and jobs are submitted. Jobs are then cancelled the jobs and re-submitted. The time it takes in each case from the moment each job is submitted till the last job enters running state is noted.

The second experiment shows that the JMN is able to recover when a job is in the dispatching state. In this experiment, three jobs were submitted. One job contained nine PEs, and the other two jobs contained thirty two 32 PEs. The state-based fault injection technique was used to modify the FSM dispatching state so that the FSM engine invokes the crashJmn method while it is dispatching the third job after half of its PEs are dispatched. During the recovery, the JMN detects that one of the jobs is still in dispatching state. Therefore, the JMN attempts to finish the dispatch. The JMN reports that the job successfully completes the dispatch and that the JMN is ready to receive new job requests.

The following table illustrates a comparison of the times required to start new jobs as opposed to the times required to start the same jobs following a JMN failure and recovery. As shown, the performance of JMN recovery in accordance with the present invention is favorable compared to restarting the jobs from scratch, for a steady state crash.

| Test # | # of nodes | # of PEs | secs. to start jobs | secs. to recover |
|--------|------------|----------|---------------------|------------------|
| 1      | 10         | 31       | 2.0                 | 7.6              |
| 2      | 10         | 310      | 9.1                 | 8.8              |
| 3      | 30         | 310      | 9.1                 | 8.0              |
| 4      | 30         | 930      | 26.3                | 15.1             |
| 5      | 90         | 930      | 33.9                | 16.2             |
| 6(RWS) | 90         | 737      | 27.0                | 75.4             |

Figure 6:
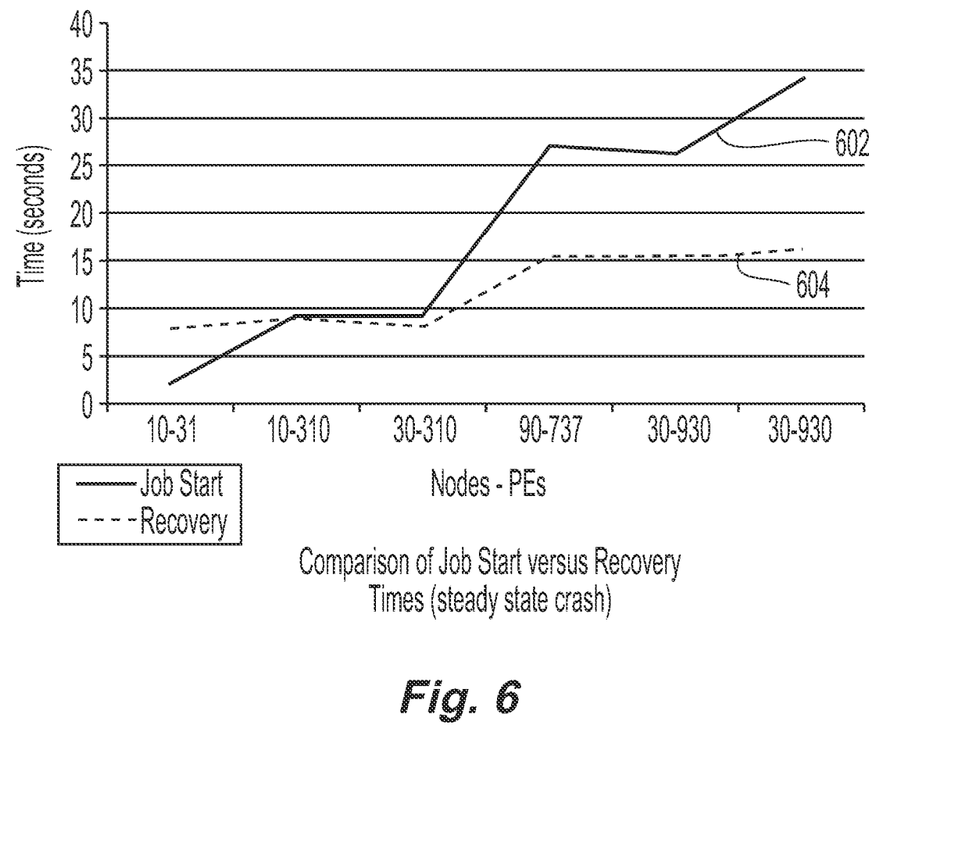
FIG. 6 is a graph illustrating a comparison of job start versus recovery times for a steady state job manager crash.

The same comparison is show graphically in FIG. 6, for job start times 602 and job recovery times 604. It should be noted that the seconds to startup jobs only includes time since the first job was submitted until all jobs were running and the seconds to recover includes only JMN boot time plus time needed to recover all PEs as running. For each node and PE number combination shown above, the experiment was conducted 10 times. Average times are shown. The table and graph show that for a very small number of PEs, the recovery time is more than the start time. However as the number of PEs in the system increase, the recovery time increases very slowly as compared to job startup times.

Exemplary embodiments of methods in accordance with the present invention can be applied to systems other than distributed stream processing systems. For example, when the PEs are not streaming PEs, the step of reconciling with the DGM is not needed. Other systems may have components that need to participate in a distributed recovery, to which the present invention can be applied. For example, another type of distributed PE may be virtual worlds. A virtual world manager (VWM) component may be employed to assist in managing these types of PEs. Virtual world processing element states are checkpointed and recovered, and the VWM component may participate in JMN recovery. Yet another type of PE may be a system level PE that performs a service for the JMN itself, these types of elements being managed by a system service manager (SSM) component.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for failure recovery of a job manager in a cooperative data stream processing system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for failure recovery of a job manager within a data processing system, the method comprising:
  instantiating a job manager on one of a plurality of nodes of a site within the data processing system;
  using the job manager instance to manage distributed execution of jobs across all of the nodes in the site including managing the deployment and execution of a plurality of processing elements associated with each job across all the nodes in the site in accordance with instructions from a job scheduler;
  checkpointing a current state associated with each one of the plurality of processing elements associated with the jobs managed by the job manager; and
  recovering the job manager subsequent to a failure of the job manager using the checkpointed processing element states.

2. The method of claim 1, wherein the step of checkpointing the current state further comprises checkpointing the current state of each processing element in response to a state change.

3. The method of claim 1, wherein the step of checkpointing the current state further comprises saving the current state of each one of the plurality of processing elements to a persistence mechanism in communication with the job manager.

4. The method of claim 3, wherein the persistence mechanism comprises at least one database in communication with the job manager.

5. The method of claim 1, wherein the step of recovering the job manager instance further comprises:
  instantiating a replacement job manager;
  retrieving the checkpointed processing element states using the replacement job manager; and
  constructing an initial recovered state for each job and its constituent processing elements using the retrieved checkpointed processing element states.

6. The method of claim 5, wherein the step of recovering the job manager instance further comprises reconciling the initial recovered states for the plurality of processing elements with actual current states for the plurality of processing elements.

7. The method of claim 1, further comprising:
  suspending checkpointing of the current state for each one of the plurality of processing elements in response to the failure of the job manager; and
  resuming checkpointing of the current state for each one of the plurality of processing elements following recovery of the job manager.

8. The method of claim 7, wherein the step of suspending checkpointing further comprises maintaining a chronological log of checkpointed states at each one of the plurality of processing elements; and
  the step of resuming checkpointing further comprises delivering the chronological log of checkpointed states from each one of the plurality of processing elements to the recovered job manager.

9. The method of claim 1, further comprising checkpointing the current state associated with each one of the plurality of processing elements at each node on which the plurality of processing elements are being executed.

10. The method of claim 1, further comprising determining a current job state for each job managed by the job manager using the checkpoint processing element states; and saving the current job states in a persistence mechanism in communication with the job manager.

11. The method of claim 10, further comprising updating each saved current job state in response to changes in the checkpointed processing element states.

12. The method of claim 10, wherein the step of recovering the job manager further comprises using the saved current job states.

13. The method of claim 12, wherein the step of using the saved current job states further comprises identifying uncompleted jobs based on the saved current job states.

14. The method of claim 10, wherein the current job states comprise submitted, mapping, dispatching, canceling and running.

15. The method of claim 1, further comprising accounting for failures in at least one of processing elements, execution nodes, a database management system and a dataflow graph manager that are concurrent with the job manager failure.

16. The method of claim 1, wherein the checkpointed current states comprise starling a job program element, stopping a job program element, suspending a job program element, resuming a job program element, loading a job program element, unloading a job program element, node failure, node controller failure, master node controller failure, node boot, node controller boot, master node controller boot, job manager failure or job manager boot.

17. A method for failure recovery of a job manager within a data processing system, the method comprising:
  instantiating a job manager on one of a plurality of nodes to manage distributed execution of jobs on the plurality of nodes, wherein management of job execution for each job comprises managing the deployment and execution of a plurality of processing elements associated with each job on the plurality of nodes in accordance with instructions from a job scheduler;
  checkpointing a current state associated with each job, the current job states comprising submitted, mapping, dispatching, canceling and running;
  checkpointing a current state associated with each one of the plurality of processing elements associated with each job managed by the job manager;
  determining a current job state for each job managed by the job manager using the checkpointed job and processing element states; and
  recovering the job manager subsequent to a failure of the job manager using the checkpointed processing element states, the checkpointed job states and the current state for each job.

18. A method for failure recovery of a job manager within a distributed processing system, the method comprising:
  instantiating a job manager on one of a plurality of nodes to manage distributed execution of jobs on the plurality of nodes, wherein management of job execution for each job comprises managing the deployment and execution of a plurality of processing elements associated with each job on the plurality of nodes in accordance with instructions from a job scheduler;
  checkpointing selected current states associated with each job, the selected current states comprising persisted states for each job and all non-selected states comprising non-persisted states for each job;
  checkpointing a current state associated with each one of the plurality of processing elements associated with the jobs managed by the job manager; and recovering the job manager subsequent to a failure of the job manager using the checkpointed job and processing element states, wherein using the checkpointed job states comprises identifying for each persisted state of each job all possible non-persisted states that can occur before a next persisted state for that job.

19. The method of claim 18, wherein the step of recovery the job manager further comprises coordinating recovery of the job manager with at least one component responsible for managing a given type of processing element.

20. The method of claim 19, wherein the component comprises a dataflow graph manager, a system service manager or a virtual world manager.

* * * * *